(12) United States Patent
Miyachi et al.

(10) Patent No.: US 6,484,612 B1
(45) Date of Patent: Nov. 26, 2002

(54) ROBOT HAND TOOL MOUNTING DEVICE (75) Inventors: Hiroshi Miyachi, Ibaraki (JP);
Yoshihiro Toshimori, Ibaraki (JP);
Motohiro Sato, Ibaraki (JP)

(73) Assignee: SMC Corporation, Tokyo (JP)

( * ) Notice: Subject to any disclaimer, the term of this patent is extended or adjusted under 35 U.S.C. 154(b) by 73 days.

(21) Appl. No.: 09/664,854

(22) Filed: Sep. 19, 2000

(30) Foreign Application Priority Data

Oct. 18, 1999 (JP) ............................................ 11-295966

(51) Int. Cl.[7] .......................... B23B 31/42; B23B 29/00
(52) U.S. Cl. ............................. 82/158; 82/160; 82/161; 82/173
(58) Field of Search .......................... 82/158, 160, 161, 82/152, 147, 150, 173

(56) References Cited

U.S. PATENT DOCUMENTS 4,993,139 A * 2/1991 Burry et al. .................... 480/7
5,088,171 A * 2/1992 Suzuki ........................ 29/26 A
5,186,476 A * 2/1993 Heel et al. .................... 29/2.03
5,864,943 A * 2/1999 Arakawa et al. .............. 29/740

* cited by examiner

Primary Examiner—Henry Tsai
(74) Attorney, Agent, or Firm—Oblon, Spivak, McClelland, Maier & Neustadt, P.C.

(57) ABSTRACT

A plurality of connecting members are provided to a tool adaptor to which a tool is mounted, a plurality of connecting jaw members having inclined faces which are engaged with and detached from the connecting members when the connecting jaw members are displaced in radial directions, a rod that expands and contracts due to operation of air pressure, and a cam-type converting mechanism for converting the expanding/contracting operation of the rod to operations of displacement of the jaw members are provided to a mounting unit mounted to a robot hand, and a stopper portion for preventing the connecting member from being detached and falling from the inclined face when the air pressure reduces is provided to each the jaw member.

5 Claims, 6 Drawing Sheets

ROBOT HAND TOOL MOUNTING DEVICE

TECHNICAL FIELD

The present invention relates to a robot hand tool mounting device for mounting a tool such as a pneumatic chuck to a hand of an assembly robot installed in an automated assembly line of electronic equipment or other products.

PRIOR ART

An assembly robot is installed in an automated assembly line of electronic equipment or the like and one of various tools such as a pneumatic chuck is mounted to a hand of the assembly robot such that the one tool can be replaced by another according to operation. A tool mounting device for mounting the tool to the hand of such an assembly robot is generally formed of a tool adaptor to which the tool is mounted and a mounting unit which is mounted to the robot hand and to which the tool adaptor is detachably connected. To the mounting unit, a pair of clamp arms opened and closed by operation of air pressure and a return spring are provided. To a central portion of the tool adaptor, on the other hand, a connecting shaft having a locking flange at its top portion is provided and the mounting unit and the tool adaptor are connected to each other by clamping the connecting shaft between the clamp arms.

However, because the mounting unit and the tool adaptor are connected by the clamp arms extending from the mounting unit and the connecting shaft extending from the tool adaptor in the above prior-art tool mounting device, an axial length of the mounting device is increased and it is difficult to reduce a thickness of the mounting device. Furthermore, because the one connecting shaft positioned at the center of the tool adaptor is clamped between the clamp arms positioned at the center of the mounting unit, an axis is likely to incline.

On the other hand, it is required that such a tool mounting device should have a superior level of safety such that the tool adaptor is not detached and does not fall from the mounting unit if the air pressure for clamping reduces unexpectedly.

DISCLOSURE OF THE INVENTION

It is a technical object of the present invention to provide a robot hand tool mounting device which can reliably connect a tool adaptor and a mounting unit such that an axis does not incline and a tool does not fall off and which has a small thickness and excellent connecting accuracy and safety.

To achieve the above object, a tool mounting device of the invention comprises a tool adaptor to which a robot hand tool is mounted and a mounting unit which is mounted to a robot hand and to which the tool adaptor is detachably connected, wherein the tool adaptor has a plurality of connecting members engaged with jaw members of the mounting unit, the mounting unit has a rod that expands and contracts by operation of air pressure, the plurality of connecting jaw members disposed at regular angles about an axis of the rod and displaced in radial directions, a converting mechanism for converting an expanding/contracting operation of the rod to operations of displacement of the jaw members, and connecting locked portions formed at outer end portions of the respective jaw members, and each the locked portion has an inclined face which is inclined downward as it extends outward and which is engaged with the connecting member to draw the tool adaptor wedgewise and a stopper portion connected to the inclined face for preventing falling of the connecting member from the locked portion.

In the tool mounting device of the invention having the above structure, if the rod is actuated by operation of the air pressure and the plurality of jaw members are displaced outward in the radial directions through the converting mechanism, the inclined face of the connecting locked portion formed on the outer end portion of each the jaw member is engaged with the connecting member of the tool adaptor and the jaw member is displaced further to pull the connecting member up along the inclined face. As a result, the tool adaptor is drawn toward the mounting unit and connected to the mounting unit. At this time, while the tool adaptor is drawn toward the mounting unit, displacement of cores of the tool adaptor and the mounting unit from each other is corrected and the tool adaptor and the mounting unit are connected coaxially and reliably. Furthermore, because the tool adaptor and the mounting unit are connected at a plurality of points by engagement of the plurality of jaw members and the connecting members with each other, inclination of axes with respect to each other is not generated and high connecting accuracy can be obtained. Moreover, by wedge effect of the inclined faces, the connecting force is increased significantly.

If the air pressure for connecting reduces in a state in which the tool adaptor and the mounting unit are connected, each the jaw member is pushed back inward in the radial direction by load that acts on the inclined face through the connecting member. However, the stopper portion is provided to an outside of the inclined face and the connecting member stops in the position of the stopper portion when the connecting member reaches the position. Therefore, the connecting members are not detached from the jaw members, thereby reliably preventing falling of the tool adaptor.

In the tool mounting device, the plurality of jaw members that can be displaced in the radial directions are provided to the mounting unit, the inclined faces formed on the jaw members are locked to the connecting members of the tool adaptor, and the tool adaptor is pulled up wedgewise by the inclined faces and connected. Therefore, an axial length can be reduced and a thickness can be reduced as compared with the prior-art mounting device in which connecting is carried out by using the clamp arms and the connecting shaft.

According to a concrete embodiment of the invention, each the stopper portion includes a horizontal face or a reversely inclined face that is inclined reversely to the inclined face and an inward component of force of load that-acts on each the jaw member through each the connecting member is canceled in a position of the stopper portion.

According to another concrete embodiment of the invention, the converting mechanism includes a cam formed on one of the rod and the jaw member and a cam groove formed on the other and the cam and the cam groove are inclined with respect to the axis of the rod and are engaged with each other such that they can slide along the inclination.

According to yet another concrete embodiment of the invention, the tool adaptor and the mounting unit respectively have air connecting portions for connecting their air piping ports, a check valve elastically biased by a spring in a valve closing direction is mounted and a push rod elastically biased by a spring in such a direction that a tip end of the push rod projects from the connecting portion on the mounting unit is provided in the air connecting portion on the mounting unit, the push rod is pushed in by the tool adaptor to open the check valve when the tool adaptor and the mounting unit are connected, and the tool adaptor is forcibly separated by elastically biasing force of the spring when the tool adaptor and the mounting unit are separated from each other.

DETAILED DESCRIPTION

A preferred representative embodiment of a robot hand tool mounting device according to the present invention will be described below in detail by reference to the drawings.

As can be seen from FIGS. 1 to 4, the tool mounting device is formed of a tool adaptor 1 to which a robot hand tool 3 such as a pneumatic chuck is mounted and a mounting unit 2 which is mounted to a robot hand 4 and to which the tool adaptor 1 is detachably connected.

The tool adaptor 1 is substantially disk-shaped, a lower face of the tool adaptor 1 is a mounting face 10 to which the tool 3 is mounted, and a plurality of connecting members 11 in shapes of shaft rods for locking jaw members 26 on the mounting unit 2 are provided at regular angles about a central axis on an upper face of the tool adaptor 1. In the example shown in the drawings, the connecting member 11 is formed of a roller having a circular sectional shape and two roller-shaped connecting members 11, 11 are provided to positions symmetric with each other on opposite sides of the central axis. These connecting members 11 are rotatably supported at opposite ends thereof by bearing members 12, 12 and disposed in parallel to each other and in a direction (horizontally) orthogonal to the central axis with gaps necessary to insert the jaw members 26 between the connecting members 11 and the upper face of the tool adaptor 1 maintained.

However, the connecting members 11 may be mounted fixedly. The connecting members 11 do not necessarily have to be made of rollers having the circular sectional shapes and may have semicolumnar shape or other shapes if portions of the connecting members 11 in contact with the jaw members 26 are smooth curved faces.

Figure 1:
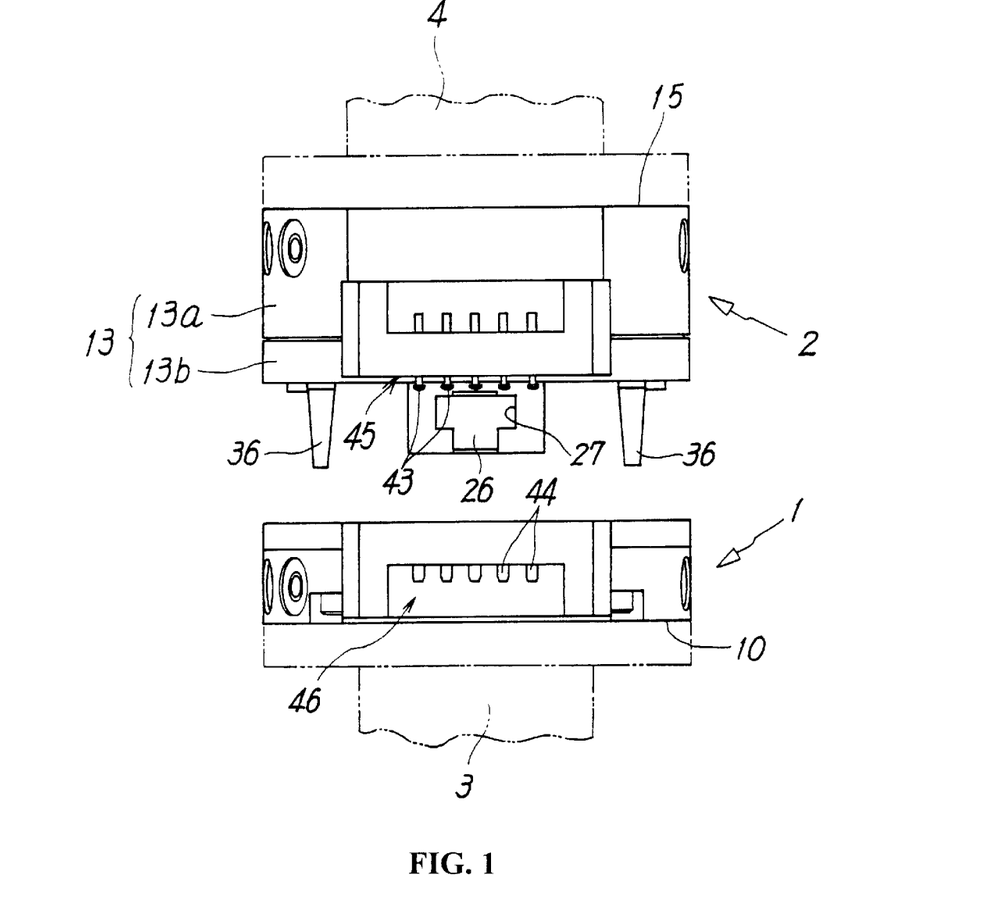
FIG. 1 is a front view in a separated state of an embodiment of a tool mounting device according to the present invention.
Figure 2:
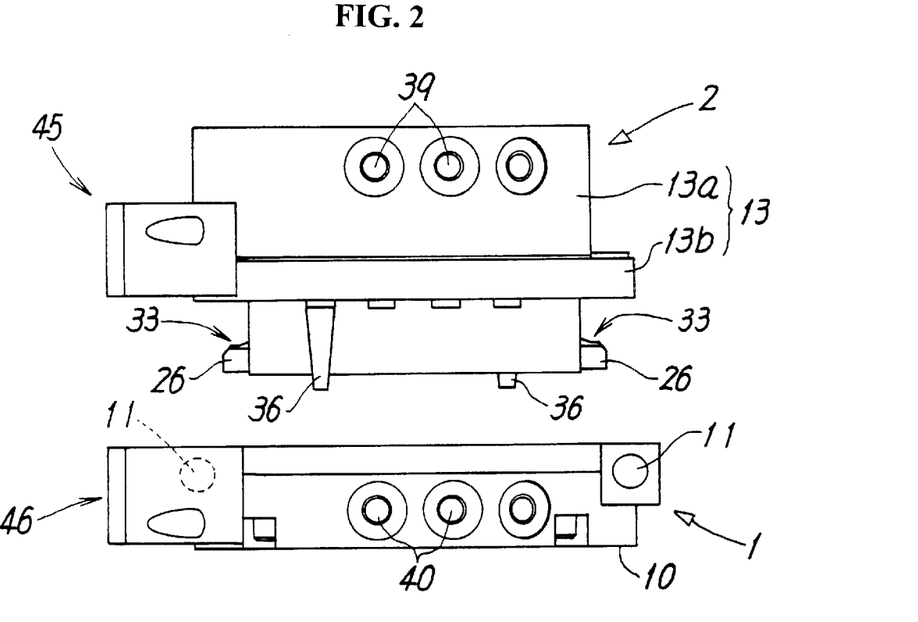
FIG. 2 is a side view of FIG. 1.
Figure 3:
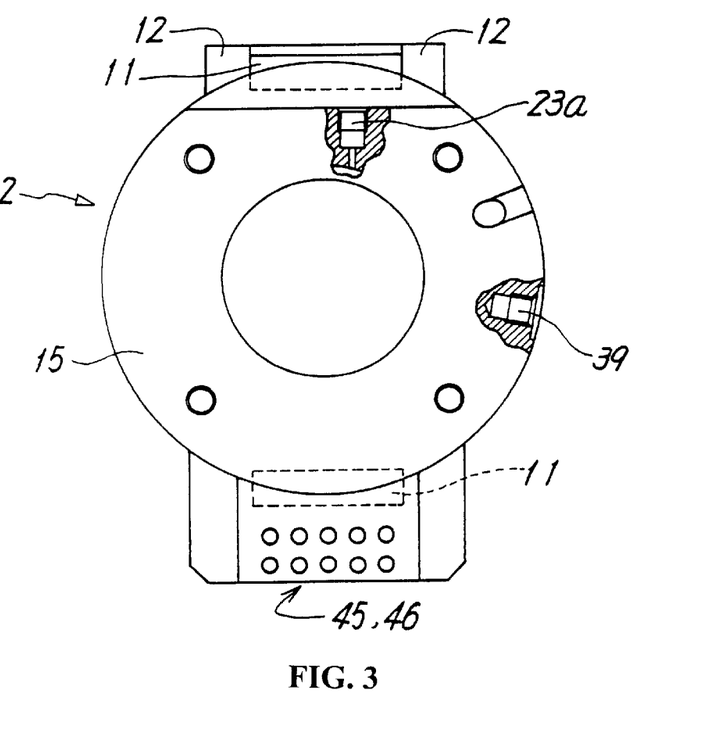
FIG. 3 is a plan view of FIG. 1.
Figure 4:
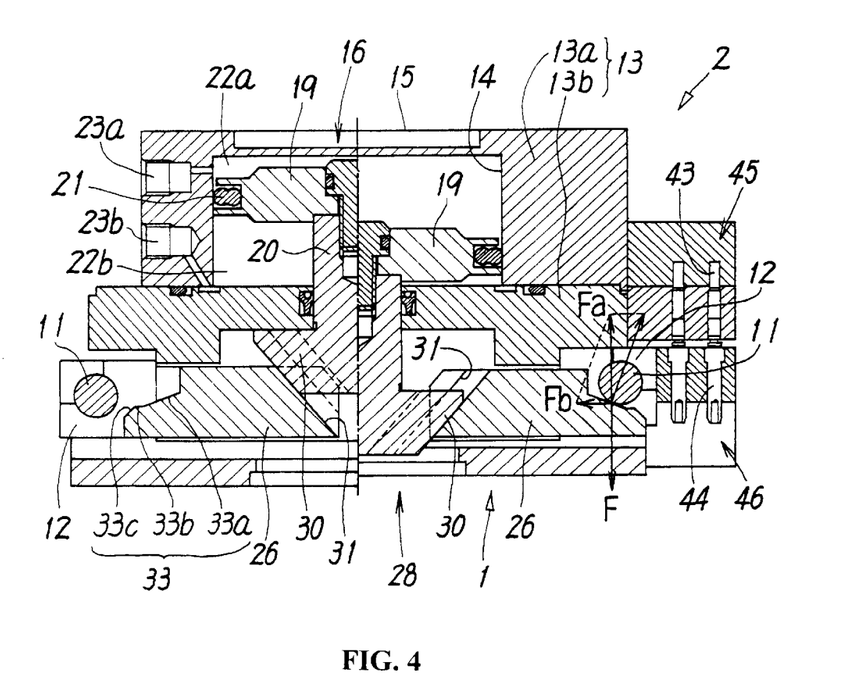
FIG. 4 is a sectional view in which a connected state of the tool mounting device is shown in a right half portion and a separated state is shown in a left half portion.

On the other hand, the mounting unit 2 has a casing 13 in a short columnar shape. The casing 13 is formed of a first member 13a having a cylinder bore 14 inside the member 13a and a disk-shaped second member 13b for closing an opening in a lower face of the first member 13a. An upper face of the first member 13a is a mounting face 15 mounted to the robot hand 4 and an air cylinder mechanism 16 is mounted in the casing 13.

The air cylinder mechanism 16 is formed of a piston 19 that can slide in the cylinder bore 14 and a rod 20 having a base end connected to the piston 19 and a tip end projecting from the second member 13b. A pair of pressure chambers 22a and 22b separated by packing 21 are provided on opposite sides of the piston 19 and the respective pressure chambers 22a and 22b are connected to a pair of operating ports 23a and 23b that open in a side face of the casing 13. By supplying and discharging compressed air alternately to and from the respective pressure chambers 22a and 22b from and to the ports 23a and 23b, the piston 19 slides within the cylinder bore 14 and the rod 20 expands and contracts in synchronization of the sliding.

To a lower face of the second member 13b of he casing 13, a plurality of (two in the example shown in the drawings) connecting jaw members 26, 26 are provided. The jaw members 26 have substantially T-shaped sectional shapes, are disposed at regular angles about an axis of the rod 20, and are housed for sliding in guide grooves 27 formed in the second member 13b such that the jaw members 26 can be displaced in radial directions. Between the jaw members 26 and the rod 20, a converting mechanism 28 for converting the expanding/contracting operation of the rod 20 to the operations of displacement of the jaw members 26 is provided.

The converting mechanism 28 is of a cam type and is formed of a plurality of cams 30, 30 formed on an outside face of the tip end portion of the rod 20 to correspond to the respective jaw members 26, 26 and cam grooves 31 formed in the base end portions of the respective jaw members 26 and engaged with the cams 30. The cams 30 and the cam grooves 31 are inclined in the same directions with respect to the axis of the rod 20. When the rod 20 contracts as shown in the left half portion of FIG. 4, the jaw members 26 are drawn by the respective cams 30 and are displaced inward in the casing 13. When the rod 20 extends from this state as shown in the right half portion of FIG. 4, the jaw members 26 are pushed by the respective cams 30 and are displaced outward in the casing 13.

Connecting locked portions 33 locked to the connecting members 11 on the tool adaptor 1 are respectively formed on outer end portions of the respective jaw members 26. The locked portion 33 is formed of an inclined face 33a formed on an upper face of the jaw member 26 and inclined downward as it extends outward, a stopper portion 33b formed of a horizontal face or a reversely inclined face that is inclined reversely to the inclined face 33a, connected to an outside of the inclined face 33a, and prevents the connecting member 11 from being detached and falling from the locked portion, and a second inclined face 33c that is connected to an outside of the stopper portion 33b and that functions so as to pull the locked member 11 up onto the inclined face 33a. By the jaw members 26 and the connecting members 11, the mounting unit 2 and the tool adaptor 1 are connected and separated in the following manner.

In other words, the mounting unit 2 and the tool adaptor 1 are moved close to each other in a state in which the respective jaw members 26 are displaced inward in the casing 13 by contraction of the rod 20 as shown in the left half portion of FIG. 4 and the rod 20 is expanded to displace the jaw members 26 outward in the casing 13 by the respective cams 30 as shown in the right half portion of FIG. 4 from that state. As a result, the second inclined face 33c of each the engaged portion 33 is first locked to the connecting member 11 to pull the connecting member up onto the inclined face 33a. Then, if the jaw members 26 continue to be displaced outward in that state, because the connecting members 11 are pulled up wedgewise along the inclined face 33a, the tool adaptor 1 is drawn to such a position as to be pressed against the mounting unit 2 and connected to the mounting unit 2.

At this time, while the tool adaptor 1 is drawn toward the mounting unit 2 along the inclined faces 33a of the plurality of jaw members 26, displacement of cores of the tool adaptor 1 and the mounting unit 2 from each other is corrected and the tool adaptor 1 and the mounting unit 2 are connected coaxially. Furthermore, because the tool adaptor 1 and the mounting unit 2 are connected at a plurality of points by engagement of the plurality of jaw members 26 and the connecting members 11 with each other, inclination of axes with respect to each other is not generated and high connecting accuracy can be obtained. Moreover, by wedge effect of the inclined faces 33a, the connecting force is increased significantly.

In order to separate the connected tool adaptor 1 from the mounting unit 2, as shown in the left half portion of FIG. 4, by contracting the pistons 19 and displacing the respective jaw members 26 to an inner end portion of the casing 13, the locked portions 33 are detached from the connecting members 11 and the tool adaptor 1 can be detached.

Figure 5:
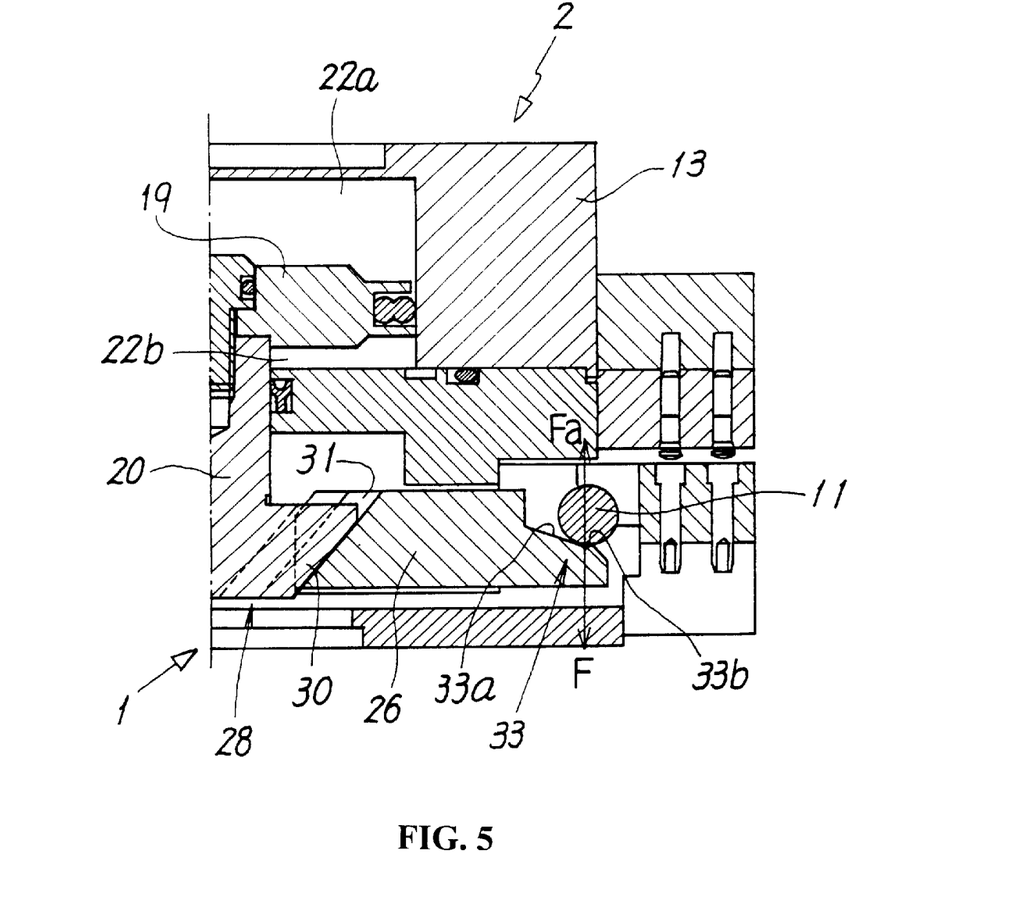
FIG. 5 is a sectional view of an essential portion of a different operating state of FIG. 4.

If the air pressure for connecting is reduced in a state in which the tool adaptor 1 and the mounting unit 2 are connected, the tool adaptor 1 is prevented from falling by a falling preventing function of the stopper portions 33b provided to the locked portions 33. In other words, as shown in the right half portion of FIG. 4, a load F due to gravity of the tool 3 acts through the connecting members 11 on the inclined faces 33a of the respective jaw members 26 in the connected state and the respective jaw members 26 are pushed inward in the casing 13 by a component Fb of reaction force Fa. In this state, if the air pressure in the head-side pressure chamber 22a reduces, each the jaw member 26 is pushed back inward by the component Fb of the force as shown in FIG. 5. However, when the connecting member 11 reaches a position of the stopper portion 33b, only a vertical component of the load F that acts on the stopper portion 33b through the connecting member 11 remains and the component Fb for pushing the jaw member 26 back inward is not generated. Therefore, further displacement of the jaw members 26 is stopped and the connecting members 11 are not detached from the jaw members 26, thereby preventing falling of the tool adaptor 1.

Figure 6:
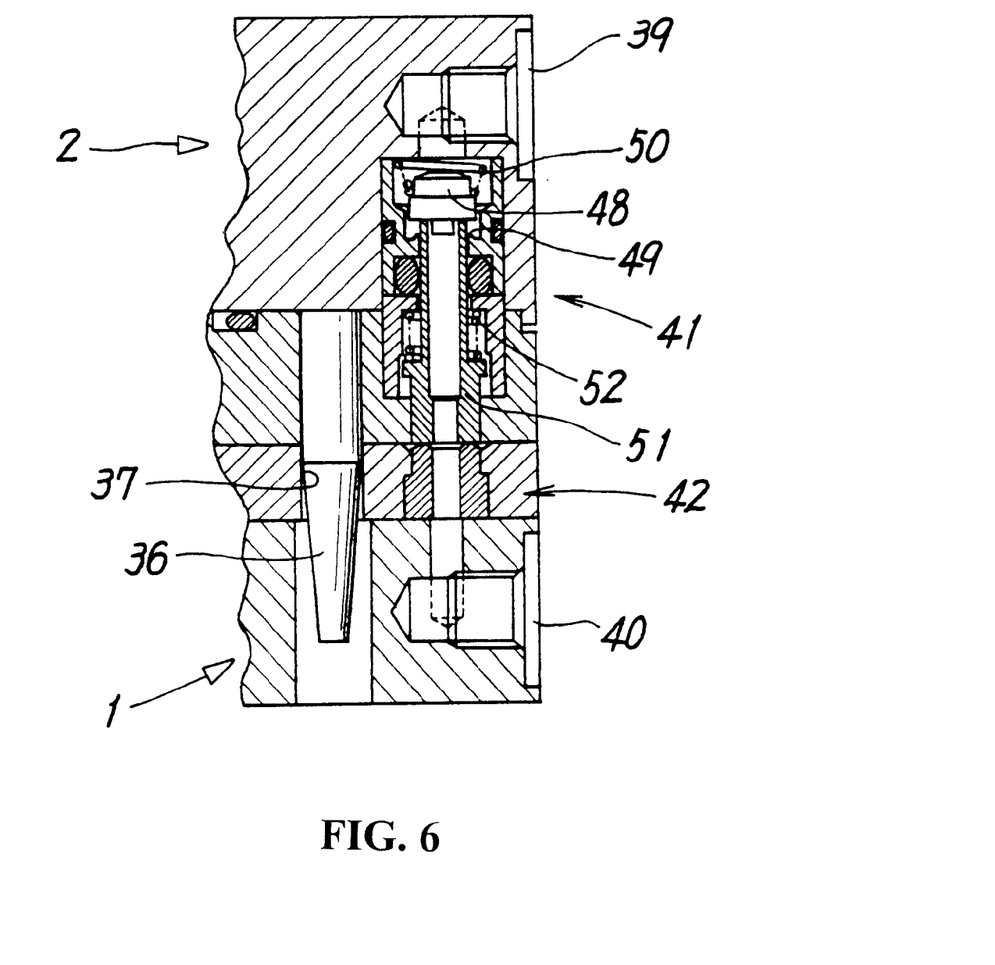
FIG. 6 is a sectional view of an essential portion of a connected state of another portion of the tool mounting device.

In order to carry out positioning in connecting the tool adaptor 1 and the mounting unit 2, a plurality of tapered positioning pins 36 are provided to a lower face of the casing 13 of the mounting unit 2 and a plurality of holes 37 into which the pins 36 are fitted are provided to the tool adaptor 1 to correspond to the pins 36 as shown in FIG. 6.

Figure 7:
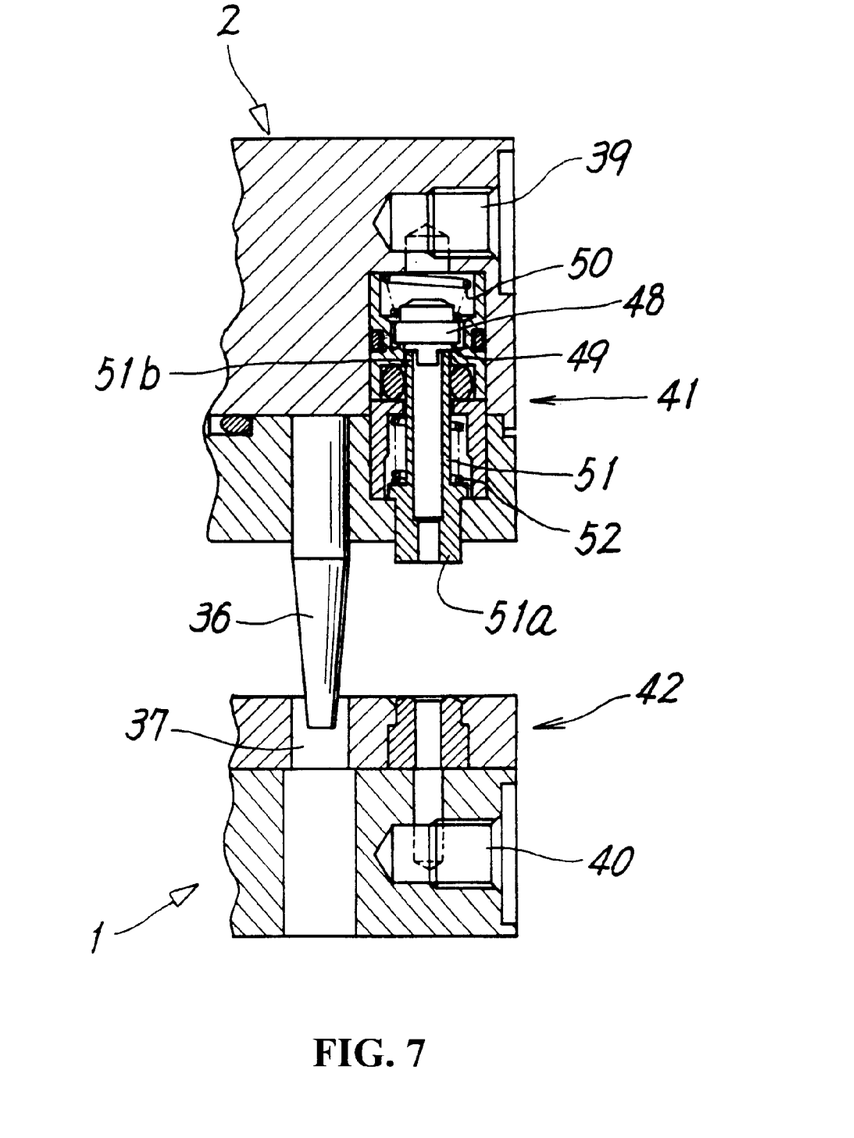
FIG. 7 is a sectional view in a separates state in FIG. 6.

To the tool adaptor 1 and the mounting unit 2, air connecting portions 41 and 42 for connecting a plurality of air piping ports 39 and 40 respectively provided to the tool adaptor 1 and the mounting unit 2 and electric connecting portions 45 and 46 for connecting electric contacts 43 and 44 are provided. To the air connecting portion 41 on the mounting unit 2, as can be seen from FIGS. 6 and 7, a check valve 48 elastically biased by a spring 50 in such a direction as to close a valve seat 49 is mounted and a hollow push rod 51 elastically biased by a spring 52 in such a direction that a tip end 51a projects from the air connecting portion 41 is provided in a channel corresponding to each the port 39. The push rod 51 is in a state in which a base end 51b is separated from the check valve 48 and the tip end 51a project from the connecting portion 41 when the tool adaptor 1 is not connected to the mounting unit 2. If the tool adaptor 1 is connected, the push rod 51 is pushed into by the tool adaptor 1 to push the check valve 48 upward, thereby opening the valve seat 49. In order to separate the tool adaptor 1 from the mounting unit 2, the push rod 51 returns to the projecting position by elastically biasing force of the spring and performs a function of forcibly separating the tool adaptor 1 from the mounting unit 2 at this time. Therefore, it is possible to reliably detach the tool 3 from the mounting unit 2 in replacing operation if the extremely lightweight tool 3 is used.

Thus, the plurality of jaw members 26 displaced in radial directions are provided to the mounting unit 2, the inclined faces 33a formed on the jaw members 26 are locked to the connecting members 11 of the tool adaptor 1, and the tool adaptor 1 is pulled up and connected by the wedge effect of the inclined faces 33a in the tool mounting device. Therefore, an axial length can be reduced and a thickness can be reduced as compared with the prior-art mounting device in which connecting is carried out by using the clamp arms and the connecting shaft.

Although two connecting members 11 for connecting and two jaw members 26 are provided in the example shown in the drawings, three or more connecting members 11 and jaw members 26 may be provided.

As described above, the tool mounting device of the invention can reliably connect the tool adaptor and the mounting unit without inclination of the axes and generation of falling of the tool and has a small thickness and excellent connecting accuracy and safety.

What is claimed is:

1. A robot hand tool mounting device comprising a tool adaptor to which a robot hand tool is mounted and a mounting unit which is mounted to a robot hand and to which said tool adaptor is detachably connected, wherein said tool adaptor has a plurality of connecting members for locking connecting jaw members provided to said mounting unit, said mounting unit has a rod that expands and contracts by operation of air pressure, said plurality of connecting jaws disposed at regular angles about an axis of said rod and displaced in radial directions, a converting mechanism for converting at least one of an expanding operation and a contracting operation of said rod to operations of displacement of said jaw members, and connecting locked portions formed at outer end portions of said respective jaw members, and each said locked portion has an inclined face which is inclined downward as it extends outward and which performs a function of being engaged with said connecting member to draw said tool adaptor wedgewise and a stopper portion connected to said inclined face for preventing falling of said connecting member from said locked portion.

2. A tool mounting device according to claim 1, wherein each said stopper portion includes a horizontal face or a reversely inclined face that is inclined reversely to said inclined face and an inward component of force of load that acts on each said jaw member through each said connecting member is canceled in a position of said stopper portion.

3. A tool mounting device according to claim 1, wherein said converting mechanism includes a cam formed on one of said rod and said jaw member and a cam groove formed on the other and said cam and said cam groove are inclined with respect to said axis of said rod and are engaged with each other such that they can slide along said inclination.

4. A tool mounting device according to claim 2, wherein said converting mechanism includes a cam formed on one of said rod and said jaw member and a cam groove formed on the other and said cam and said cam groove are inclined with respect to said axis of said rod and are engaged with each other such that they can slide along said inclination.

5. A tool mounting device according to any one of claims 1 to 4, wherein said tool adaptor and said mounting unit respectively have air connecting portions for connecting their air piping ports, a check valve elastically biased by a spring in a valve closing direction is mounted and a push rod elastically biased by a spring in such a direction that a tip end of said push rod protects from said connecting portion on said mounting unit is provided in said air connecting portion on said mounting unit, said push rod is pushed in by said tool adaptor to open said check valve when said tool adaptor and said mounting unit are connected, and said tool adaptor is forcibly separated by elastically biasing force of said spring when said tool adaptor and said mounting unit are separated from each other.

* * * * *